United States Patent
Kranhouse et al.

(10) Patent No.: US 6,612,693 B2
(45) Date of Patent: Sep. 2, 2003

(54) PANORAMIC REVERSE GALILEAN TELESCOPE OPTICS FOR AN UNDERWATER DIVING MASK

(76) Inventors: Jon Kranhouse, 838 Hartzell St., Pacific Palisades, CA (US) 90272-3816; John R. Rogers, 404 W. Hillcrest Blvd., Monrovia, CA (US) 91016

(*) Notice: Subject to any disclaimer, the term of this patent is extended or adjusted under 35 U.S.C. 154(b) by 0 days.

(21) Appl. No.: 09/766,484

(22) Filed: Jan. 17, 2001

(65) Prior Publication Data

US 2002/0063847 A1 May 30, 2002

Related U.S. Application Data

(60) Provisional application No. 60/176,196, filed on Jan. 14, 2000.

(51) Int. Cl.[7] .................................................. G02C 1/00
(52) U.S. Cl. ................................. 351/43; 351/41; 2/428
(58) Field of Search ......................... 351/43, 41; 2/428, 2/452, 430

(56) References Cited

U.S. PATENT DOCUMENTS 3,899,244 A * 8/1975 Mulder ........................ 351/43
5,997,138 A * 12/1999 Suiter ........................... 351/43

* cited by examiner

*Primary Examiner*—Hung Xuan Dang
(74) *Attorney, Agent, or Firm*—Oppenheimer Wolff & Donnelly LLP

(57) ABSTRACT

A dive mask having a configuration of reverse Galilean telescopes. The reverse Galilean telescopes are tilted relative to each other. This configuration achieves panoramic true-sized vision underwater, instead of vision that exhibits the magnification effects experienced with flat dive masks.

32 Claims, 16 Drawing Sheets

PANORAMIC REVERSE GALILEAN TELESCOPE OPTICS FOR AN UNDERWATER DIVING MASK

CROSS-REFERENCE TO RELATED APPLICATION

This application claims the benefit of U.S. Provisional Application No. 60/176,196 filed Jan. 14, 2000, whose entire contents are hereby incorporated by reference.

BACKGROUND OF THE INVENTION

The present invention relates to diving masks of the type used in scuba diving or skin diving, and particularly to optical systems and configurations that seek to expand the diver's field-of-view underwater.

There have been many attempts to either increase underwater field-of-view, or to achieve true-size viewing underwater. Some prior art make claims that their inventions achieve both unmagnified vision and expanded field-of-view underwater such as U.S. Pat. No. 5,777,712, Sansalone; U.S. Pat. No. 3,040,616, Simpson; U.S. Pat. No. 5,523,804, Nolan. The aforesaid patents simply do not work as claimed. Other designs try to achieve panoramic views by curving the clear window in a fashion with no regard for optical consequences such as EP 0824029, Beltrani; U.S. Pat. No. 5,564,132, Kuo; U.S. Pat. No. 5,502,515, Sansalone; U.S. Pat. No. 3,483,569, Armendariz and U.S. Pat. No. 2,876,766, Rebikoff et al. These last five designs, while making claims to be free of distortion, do in fact produce prodigious amounts of distortions in size, shape, focus distance, resolution and color fringing. Patents for various positive meniscus lens configurations include U.S. Pat. No. 5,625,425, Kranhouse and U.S. Pat. No. 3,672,750, Hagen; these designs are able to achieve a wider field-of-view with reasonable resolution, however the image magnification effects of water is not entirely eliminated.

Attempting to produce both true size and panoramic vision, U.S. Pat. No. 3,899,244, Mulder is for a twin lens design comprised of a front dome and a rear converging element. A unique feature of this patent is the tilting of the two optical lens systems relative to each other as a means to increase field-of-view angle. However ray-trace analysis of this design indicates severe distortions and aberrations, aggravated by the fact that forward vision is not through the axial center of the lens system.

Using multiple panes of flat lenses of flat lenses does increase the field-of-view, as disclosed in U.S. Pat. No. 5,345,615, Garofalo, however this mask falls short of providing satisfactory results due to the extreme fragmentation of image experienced when used underwater.

Of all prior art, a most notable design for achieving true size underwater is U.S. Pat. No. 2,730,014, Ivanoff. This patent involves a reverse-Galilean telescope design, behind a flat port; however, true size is achieved with a very limited field-of-view. (by reverse-Galilean telescope, we mean a diverging lens, followed by an air space and a converging lens.) This design proved that underwater eye-hand coordination is greatly improved if the magnification effects of water can be eliminated, but panoramic vision was highly desirable.

Therefore it would be highly advantageous to provide a dive mask having both a wide field-of-view as well as achieving true size underwater, with no apparent distortions.

SUMMARY OF THE INVENTION

The present invention is for an improved optical arrangement that both increases field-of-view and achieves true size representation of objects underwater, without the effects of magnification caused by water's refractive index. Low levels of distortions and high resolution is achieved with this design.

The optical system as designed is a pair of afocal reverse Galilean telescopes behind a domed window. One afocal reverse Galilean telescope is positioned in front of each eye.

The distortions of this system, if produced as intended and as described herein, are so minimal so as to allow tilting the entire optical systems relative to each other in the horizontal axis, so as to achieve a more panoramic view.

A major improvement of all these designs over prior art is achieved by tilting the lenses relative to each other, with little deleterious effect on optical performance as perceived by the diver. This tilting provides for a reduced lens package and better mechanical clearance for the optics around the bridge of the nose of the diver, as well as providing more mechanical clearance between the left and right lens barrels.

Starting from the water side of the optical system is a dome shaped lens in contact with water. This dome lens may or may not have positioned in front of it a thin lens as described in U.S. Pat. No. 5,764,332 (Kranhouse) for improving above water vision. The next optical element in the lens system, further from the water side, is a diverging lens or diverging lens group. Continuing closer to the eye of the diver is a converging lens or converging lens group.

BRIEF DESCRIPTION OF THE DRAWINGS

The invention will hereafter be described with reference to the accompanying drawings, wherein like reference numerals denote like elements, and.

DETAILED DESCRIPTION OF PREFERRED EMBODIMENTS OF THE INVENTION

Ordinary lenses form a nearby image of distant objects. Objects that are infinitely distant are imaged to the rear focal point of the lens. for an idealized thin lens, the "focal length" refers to the distance from the lens to the rear focal point. (For more complex, multi-element lens systems, the focal length is measured from the rear principal point of the lens to the focal point. The rear principal point is the equivalent refracting locus of the rays; that is, where rays from an infinitely distant object appear to intersect the same rays after they have been refracted by the lens system.)

For visual applications, it is required that the optical system present to the eye an image that appears to be infinitely distant (i.e., the rays are parallel) or nearly so, so that the eye can comfortably focus upon it. Systems meeting this requirement therefore image an infinitely distant object to an infinitely distant image. In such cases, it could be said (with equal accuracy) that the focal length is infinite, undefined, or does not exist. Systems that meet this criterion are called "afocal" systems to distinguish them from "focal" lenses, which have well-defined focal lengths. Binoculars and opera glasses are examples of "afocal" systems that present the viewer with an image that appear to be "magnified" in that objects viewed through them subtend a larger angle than when viewed by the eye alone.

In the following FIGURE descriptions, the convention of naming the domed lens that is in contact with water as element #1, and other elements positioned behind the domed lens accordingly. Furthermore the surface of the lens element that is closest to the image being viewed shall be described as the R1 surface of that lens (i.e. the R1 of the domed lens is designed to image when contacting water; R2 is closer to the face and designed to refract into air.

The housing and attachment of this lens system to a diving mask can be accomplished according to a variety of methods known to those of ordinary skill in the art, such as using independent retainer rings mounted around the front circumference and spaced appropriately for pupillary distance.

Figure 1:
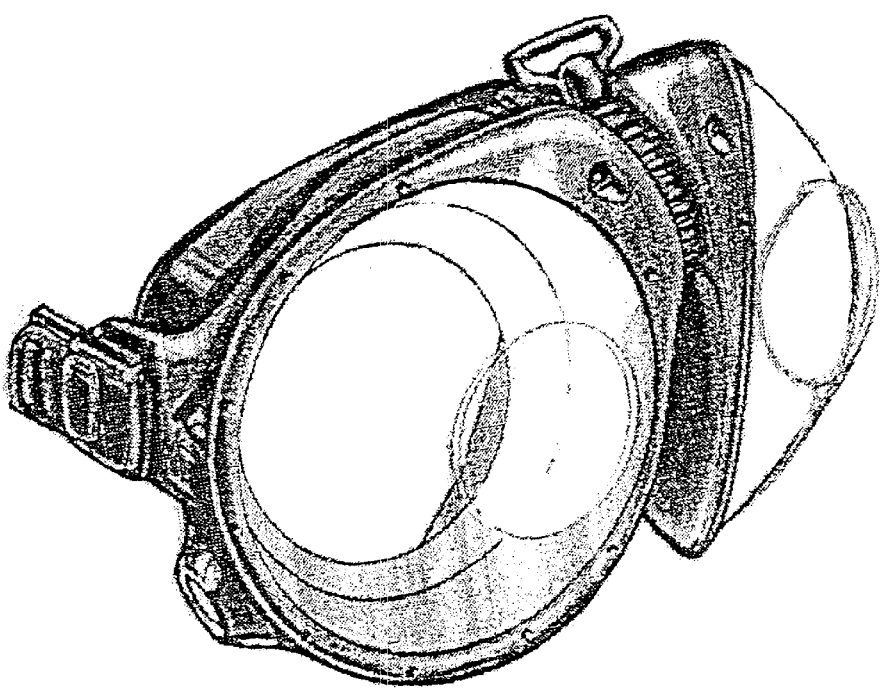
FIG. 1 is a drawing of the complete scuba mask.
Figure 2:
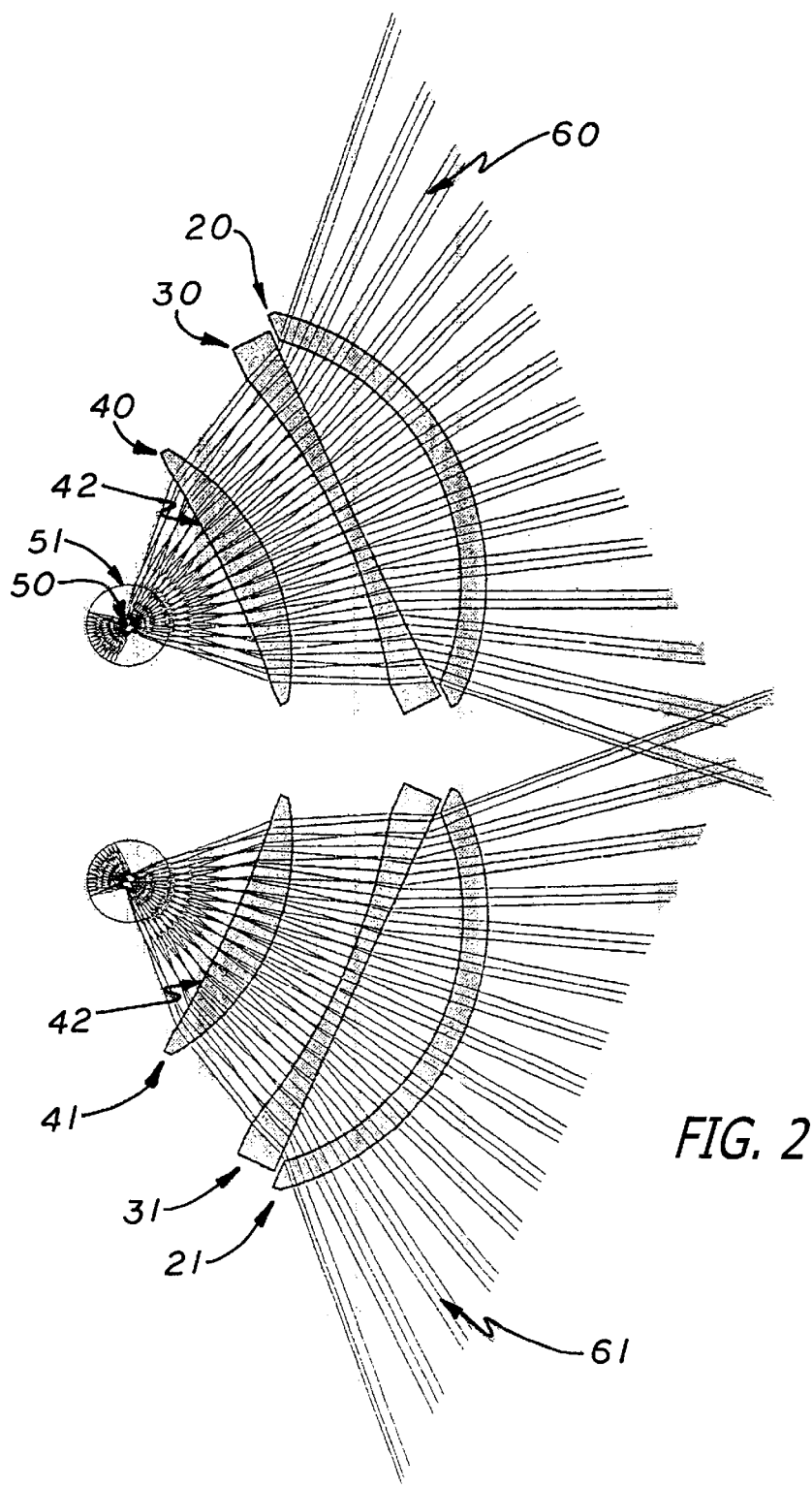
FIG. 2 is a schematic diagram of a three-element embodiment of the optical design having a glass rear element and acrylic domed lens.
Figure 3:
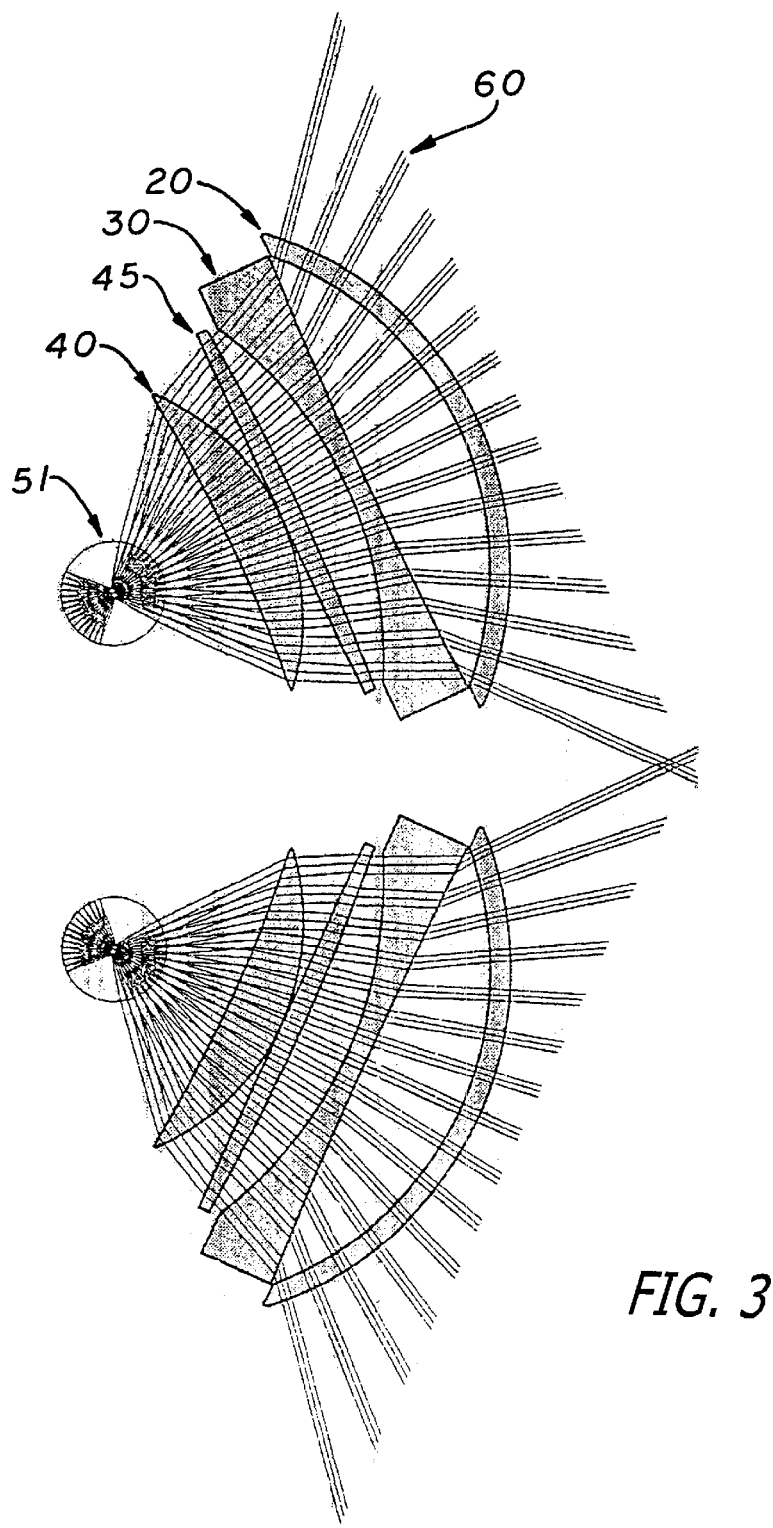
FIG. 3 is another schematic diagram of a four-element embodiment of the optical design having an extra converging lens in the rear element group and a plano-concave diverging element directly behind the dome lens.

Referring initially to FIG. 1 the following optical schematics are to be integrated into a scuba mask. The optical system could also be used for a photographic imaging system as well. The drawing indicates a flattened portion trapping distilled water on the forward part of the domed lens, as disclosed in U.S. Pat. No. 5,764,332, Kranhouse. FIG. 2 represents the preferred arrangement of the optical system, though other configurations are also possible. Referring to FIG. 2, note that ray 60 is at the same angle as ray 42, relative to the eyeball, 51. The mask is comprised of a domed lens, 20 & 21, that is in contact with water. Diverging lens 30 & 31 is positioned behind the domed lens. Converging lens 40 & 41 is positioned closest to the diver's face. Of particular note is that the entire lens system is tilted relative to forward direction, thus yielding an increased horizontal field-of-view. FIG. 3 uses a rearmost plastic element having a lower refractive index, and a high index glass at position #3.

Figure 4:
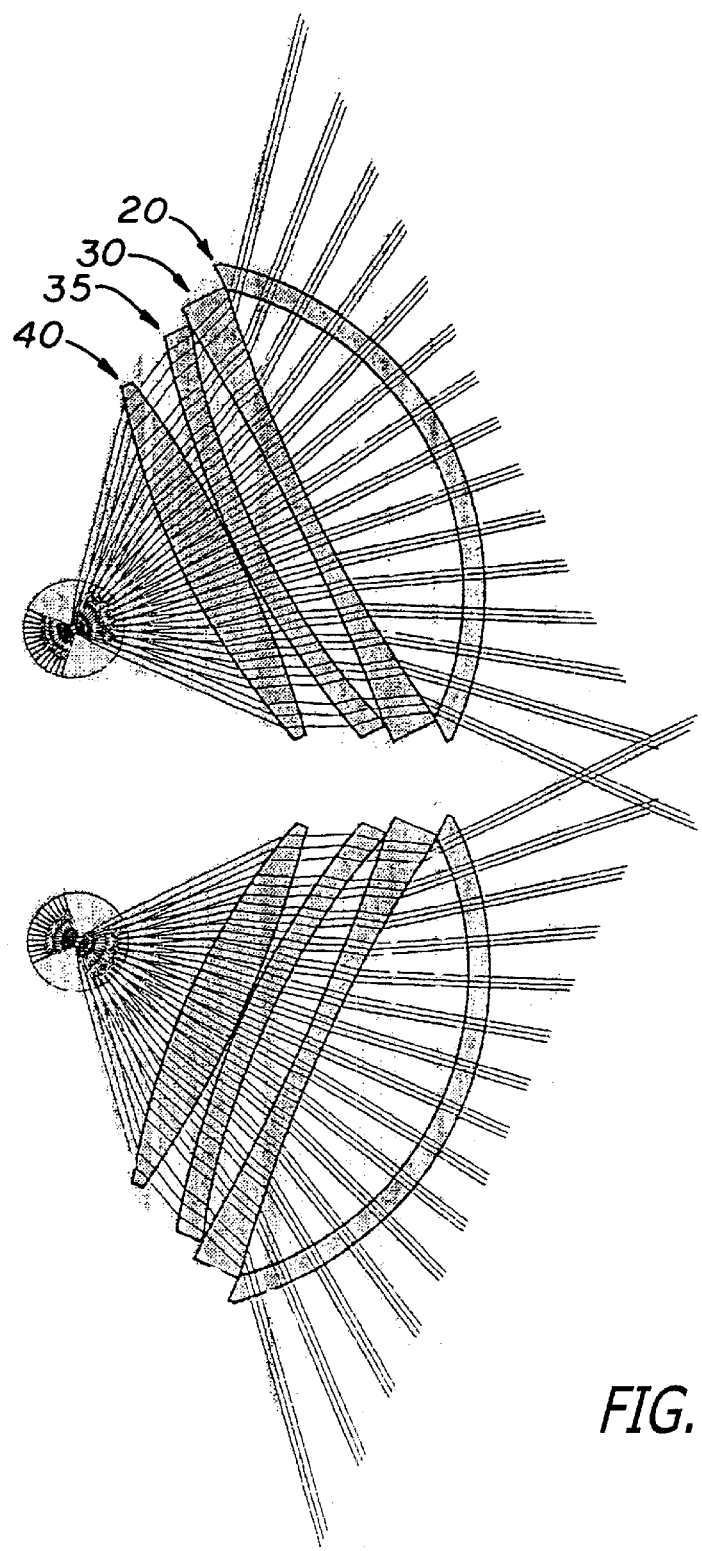
FIG. 4 is a schematic diagram of a four-element embodiment of the optical design wherein the diverging element is bi-concave.

FIG. 4 demonstrates a modification of FIG. 3, wherein element at position #3 can be concave toward the image; also the R2 side of element #4 is convex toward the face, unlike FIG. 2 wherein the R2 surface, 42, is concave. Another significant feature of FIG. 4 is element #2 is bi-concave.

Figure 5:
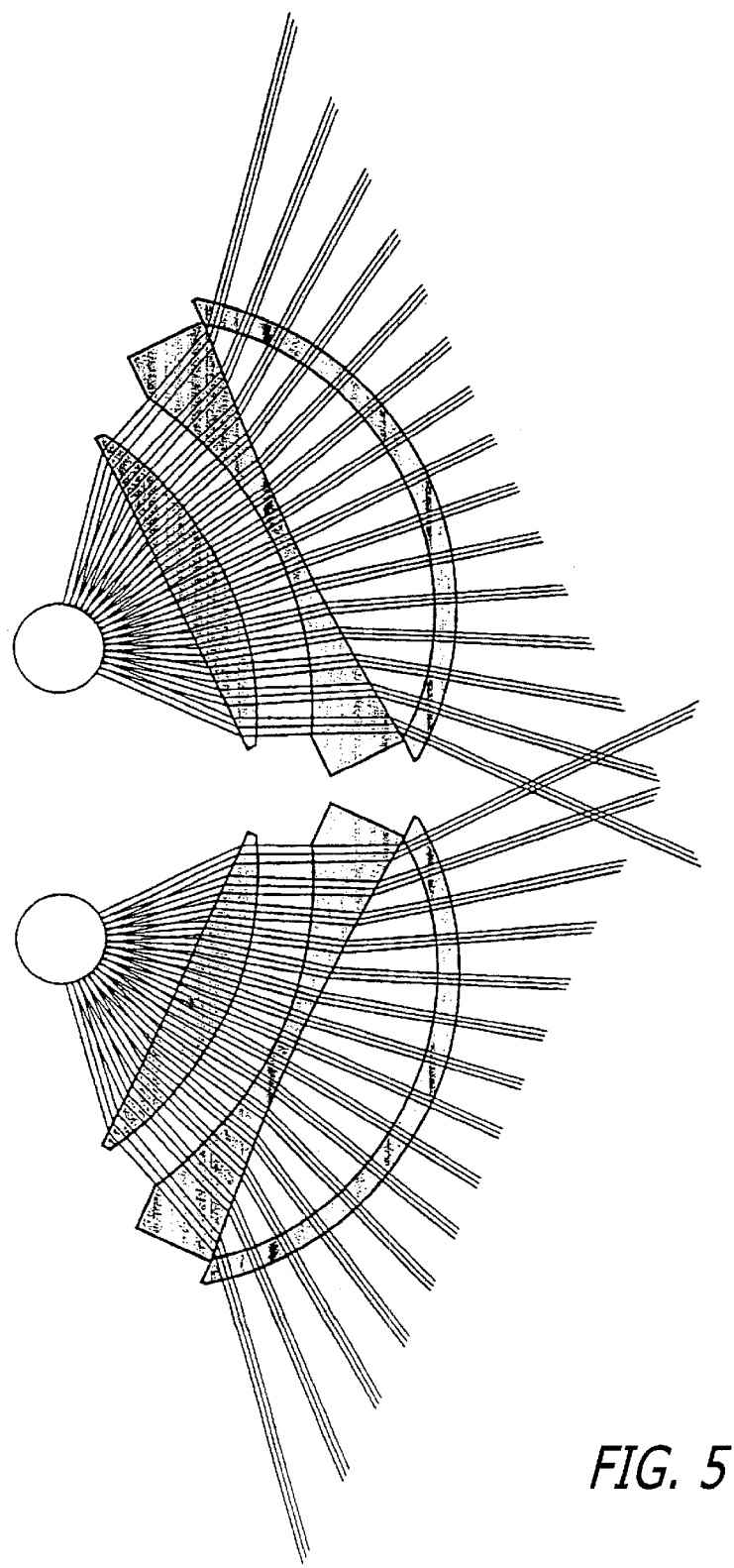
FIG. 5 is a schematic diagram of a three-element embodiment of the optical design having a lower refractive index middle diverging element with a diffractive surface.

FIG. 5 depicts a three-element systems, also tilted in the horizontal plane relative to each other. Element #2 of this system is a plastic material, having a diffractive surface to control dispersion of light.

Figure 6:
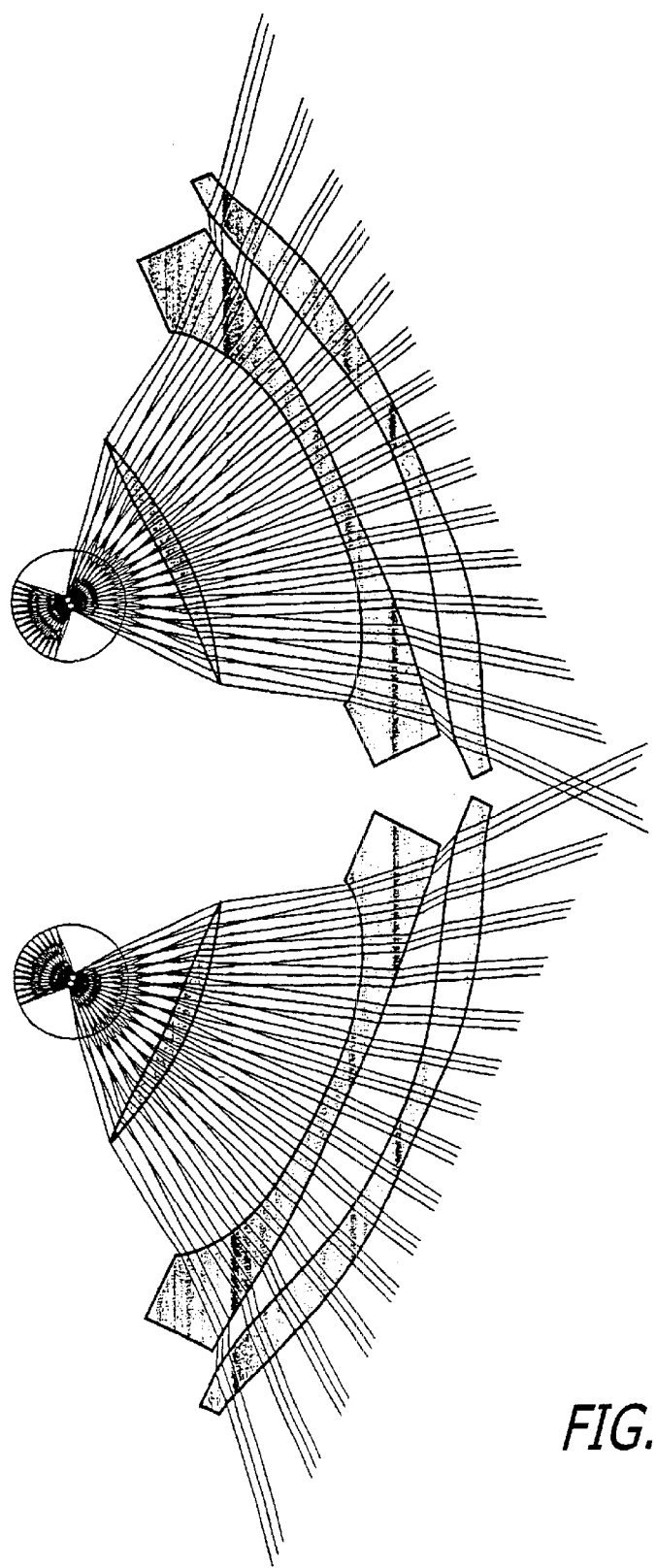
FIG. 6 is a schematic diagram of a mask optical systems wherein the water contact lens is a modified dome with flat middle portion.
Figure 7:
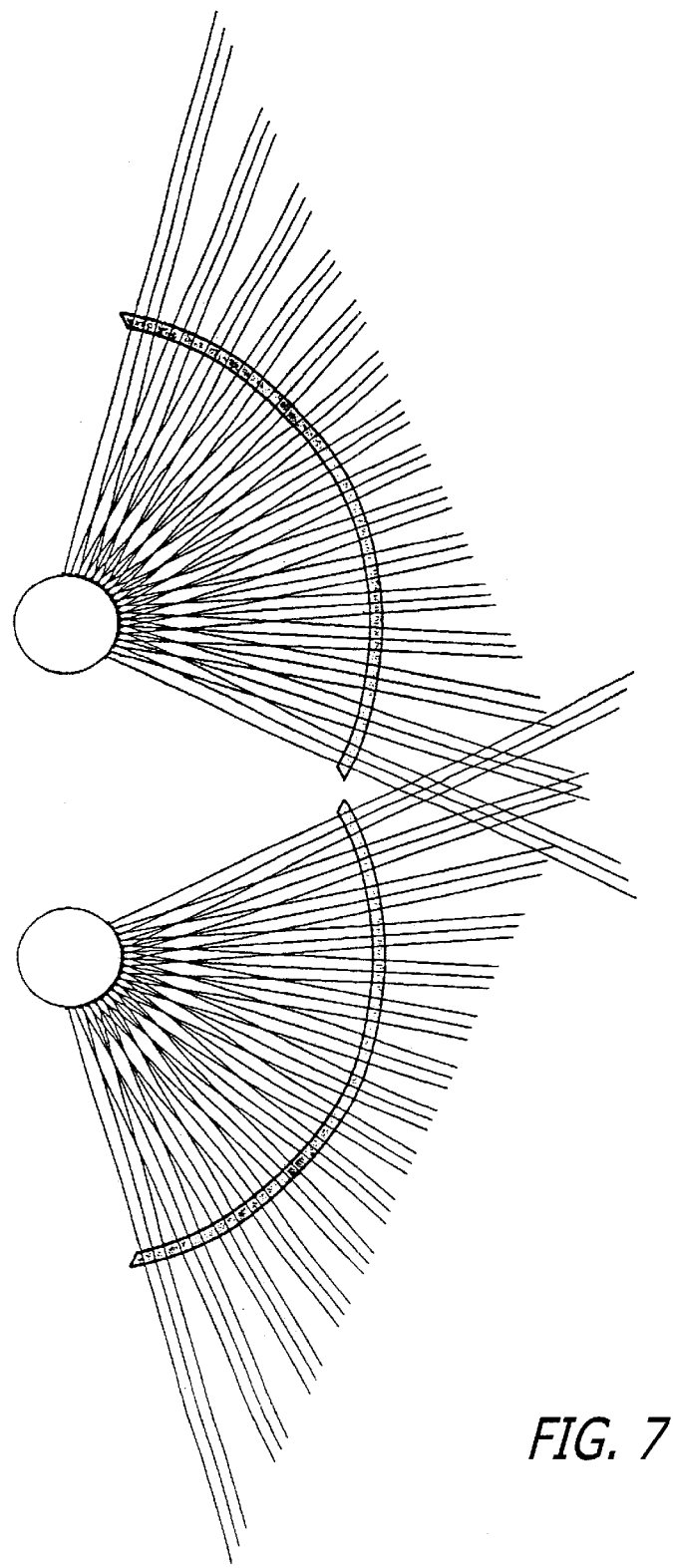
FIG. 7 is a simple hemisphere wherein the center of the eyeball rotation is concentric with the hemisphere.

FIG. 6 depicts a system wherein element #1 is greatly flattened in the front, with an aspheric transition toward the edge.

Figure 8:
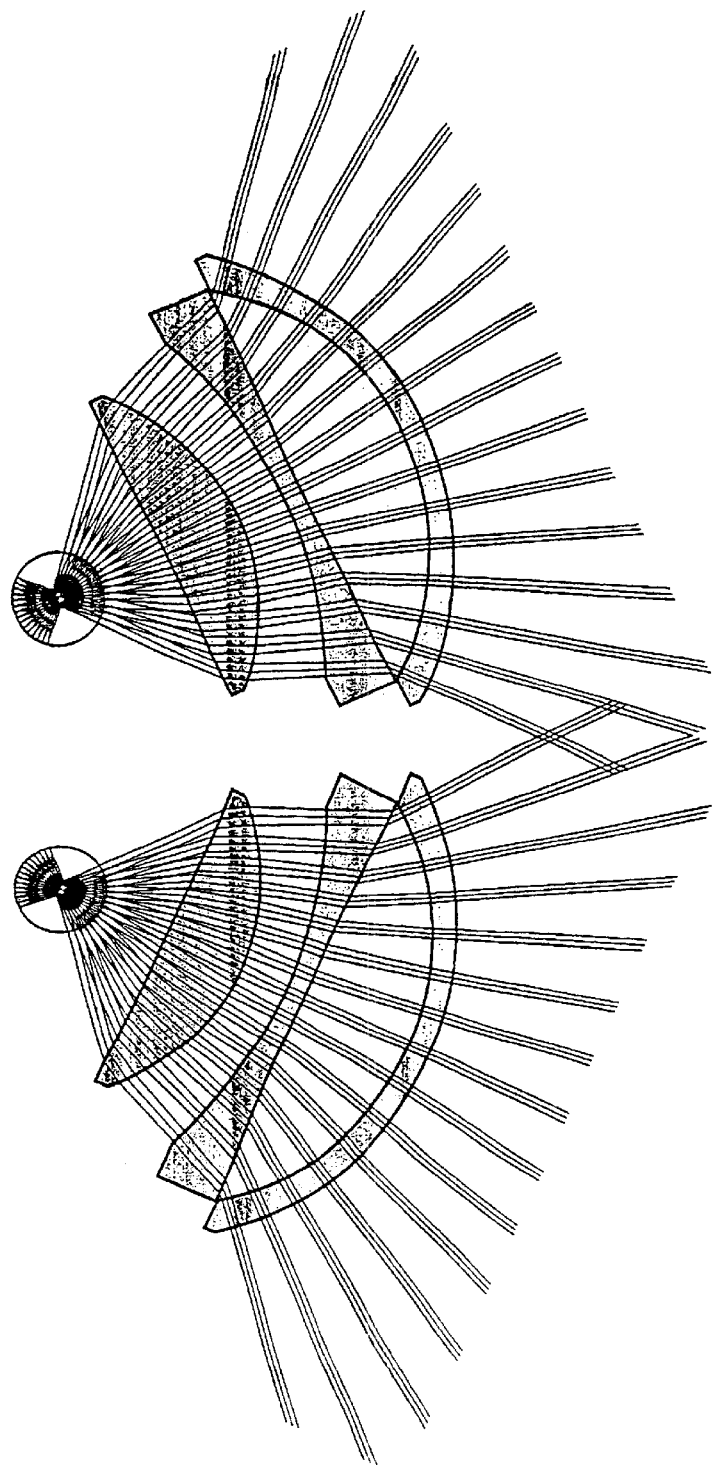
FIG. 8 is a similar configuration to FIG. 2, wherein the rear lens element is made of polycarbonate.

FIG. 8 represents that the rear element can be comprised of polycarbonate optical material as well as glass. It is desirable that the rear element be of a lower refractive index than the middle element. In this case, polycarbonate is less than ideal due to its high dispersion; however, polycarbonate represents an economical alternative to glass for the rear element.

Figure 9:
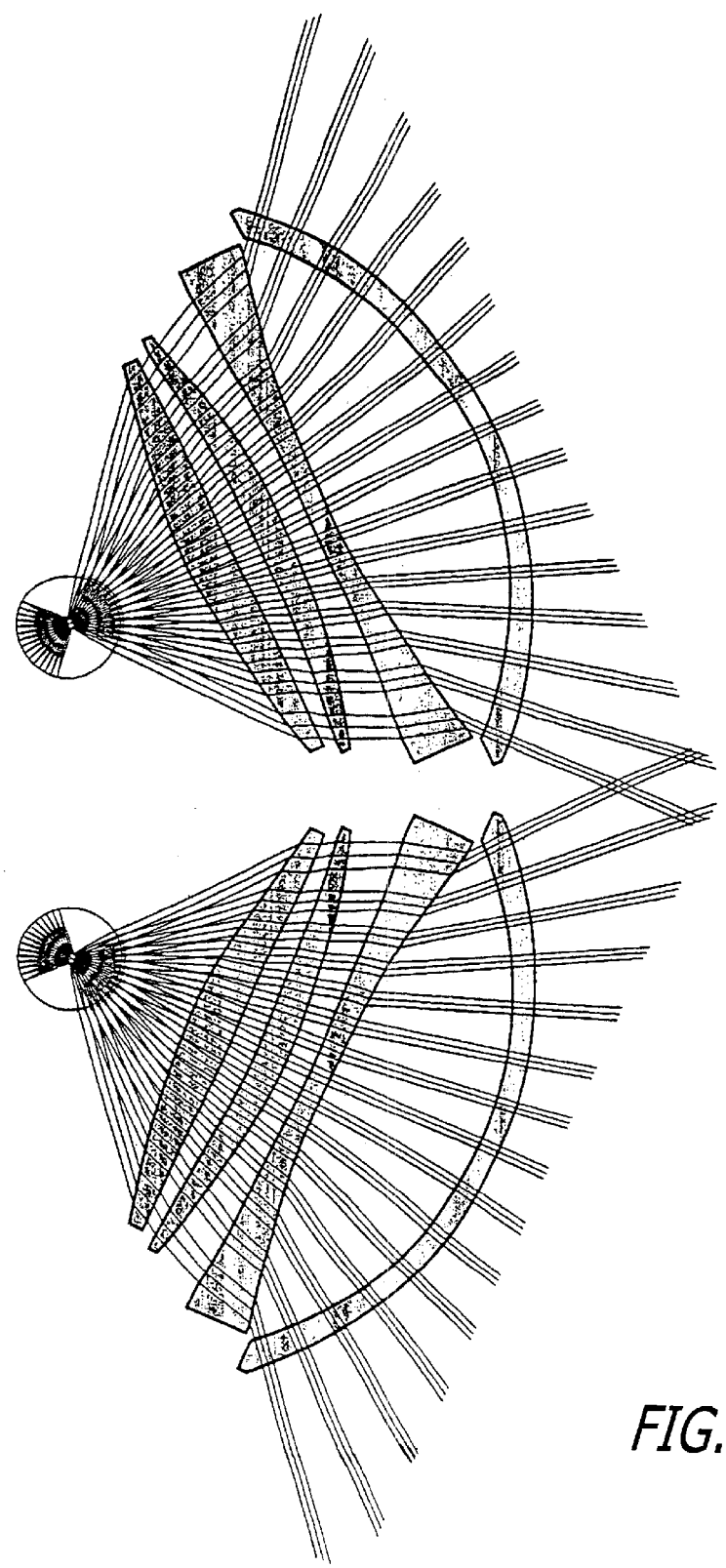
FIG. 9 is another four-element system wherein the rear converging lens group is comprised of one plastic and one glass element.
Figure 10:
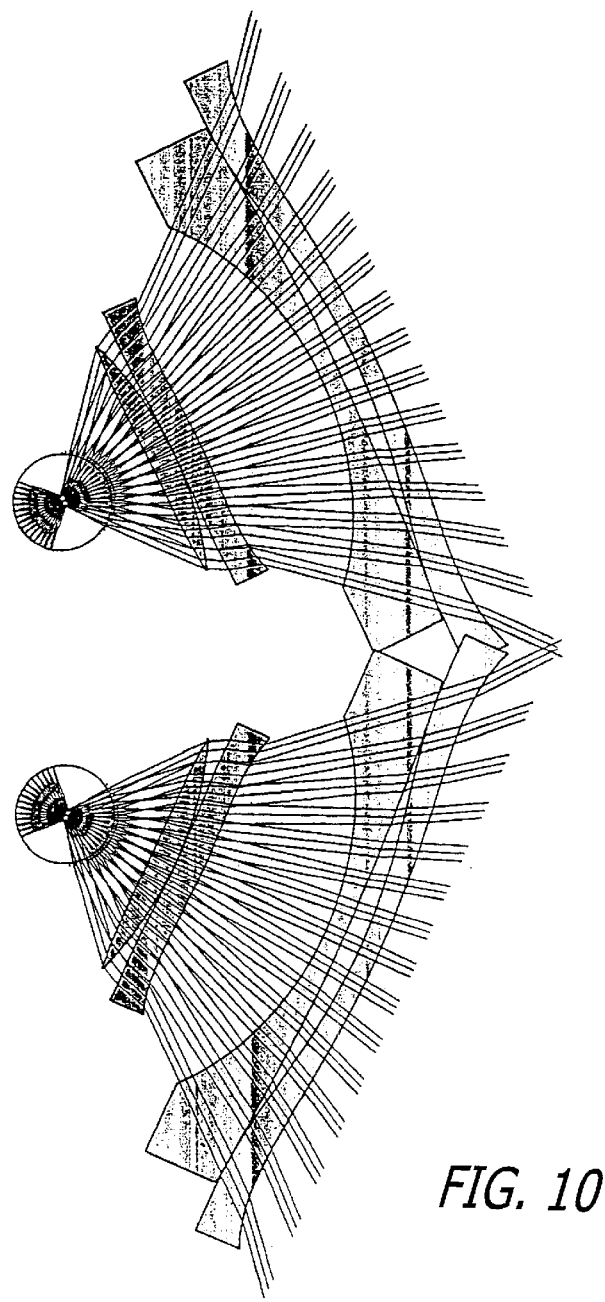
FIG. 10 is a modified Ivanoff corrector wherein the water contact lens is no longer plano, so as to correct for off-axis use of the optical system; the rear converging element has on the object side an additional element to correct for color fringing.
Figure 11:
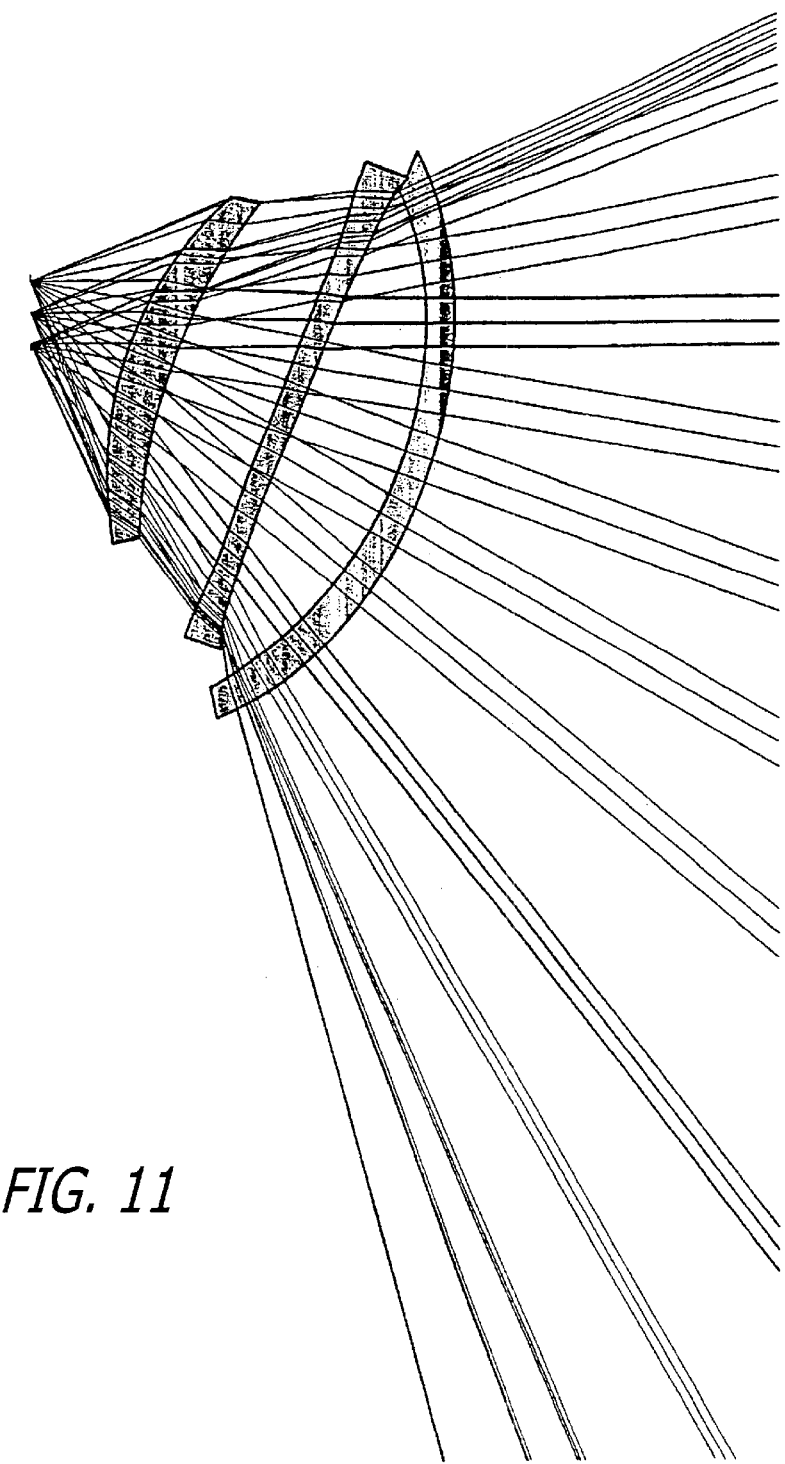
FIG. 11 is another three-element system wherein the rear element is convex toward the face of the diver.

As shown in FIG. 9, the diverging lens or lens group can be most severely concave toward either the face of the diver or toward the water side of the mask. Yet another embodiment of this design is the placement of the diverging and converging group behind a water contact element that has a large radius dome shape in the middle of the field-of-view, transitioning to a concave shape at the edge, thereby reducing aberrations.

Figure 13:
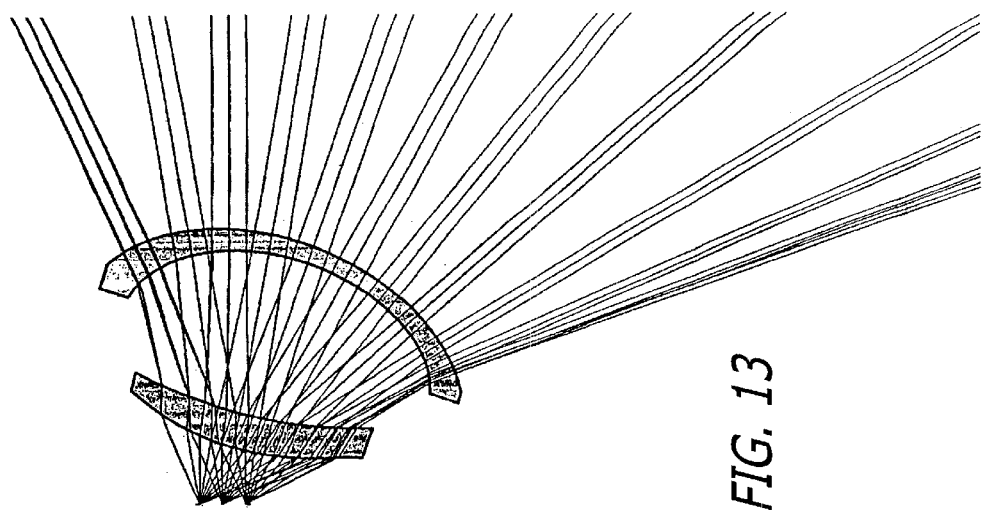
FIG. 13 is a simple two-element system wherein the rear lens element that is closest to the diver is convex toward the diver's face.
Figure 12:
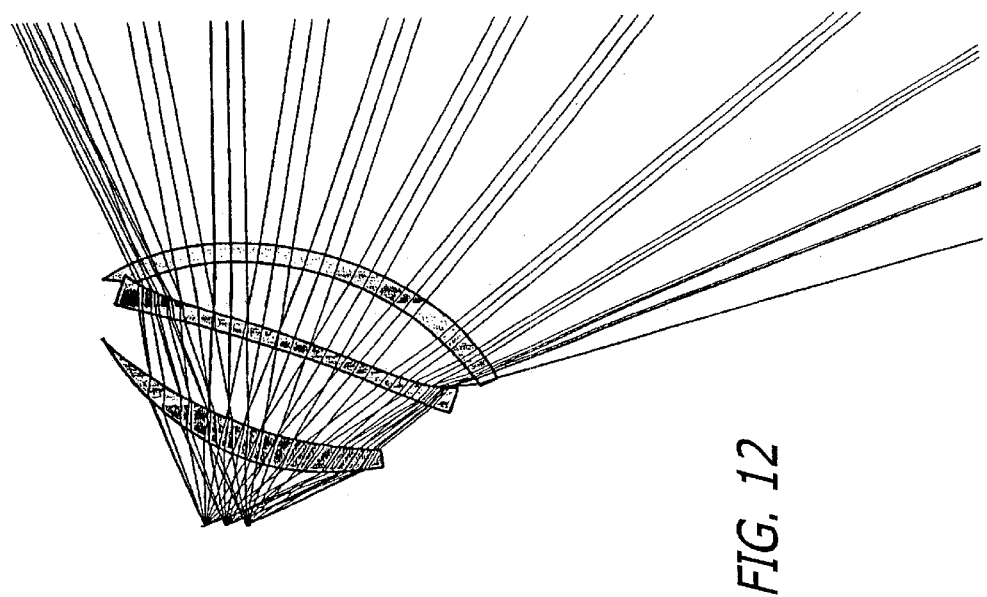
FIG. 12 is a modification of that found in FIG. 11, wherein the middle diverging element is bi-concave.
Figure 14:
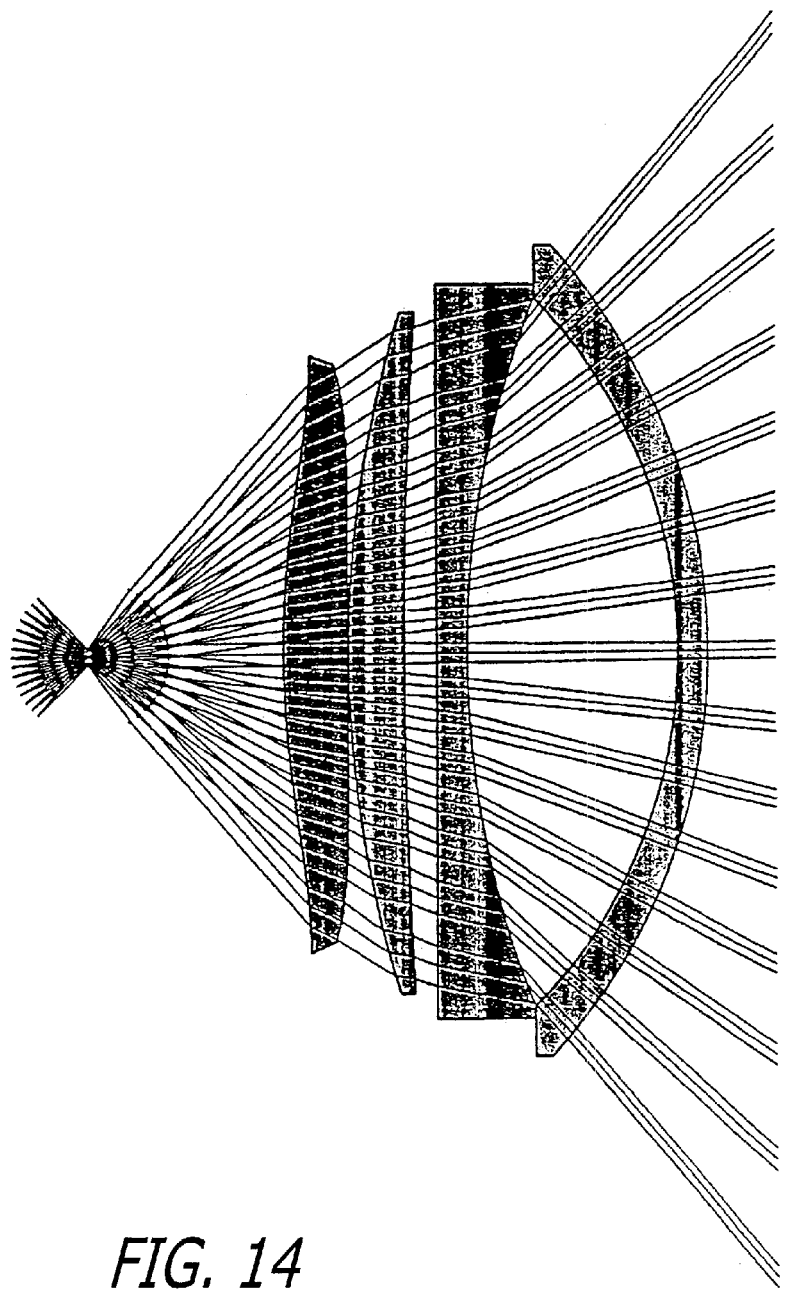
FIG. 14 is a four element system wherein the rear converging power is divided between two lens elements each having positive power, and the element directly behind the domed lens is concave toward the water.
Figure 15:
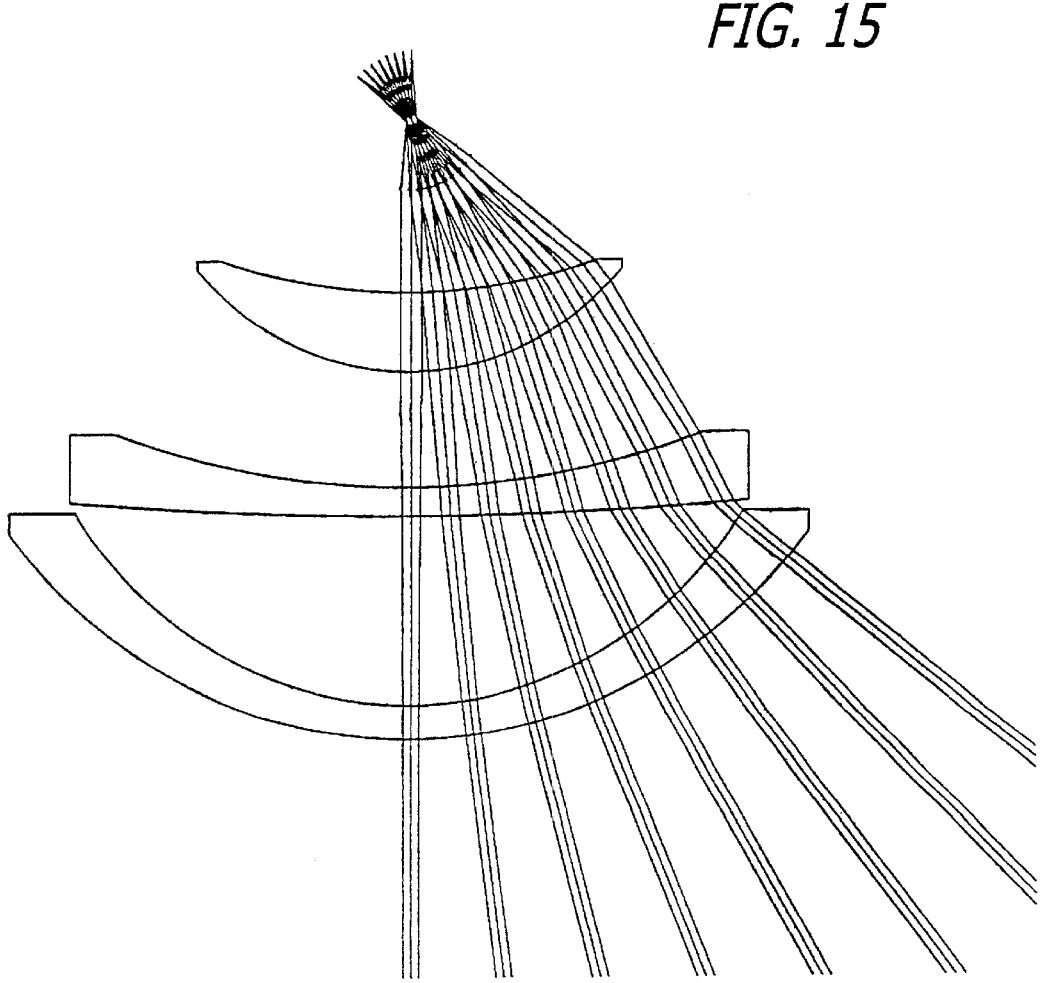
FIG. 15 is a three-element system wherein the domed lens is both aspheric and has a surface defined by a conic.
Figure 16:
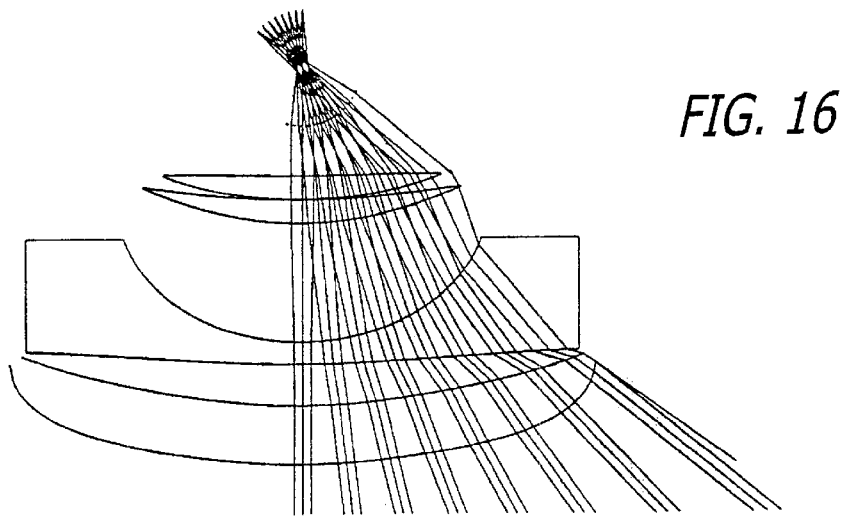
FIG. 16 is a four element system with a positive powered meniscus domed lens in contact with water and a group of two lenses at the rear providing converging power.
Figure 17:
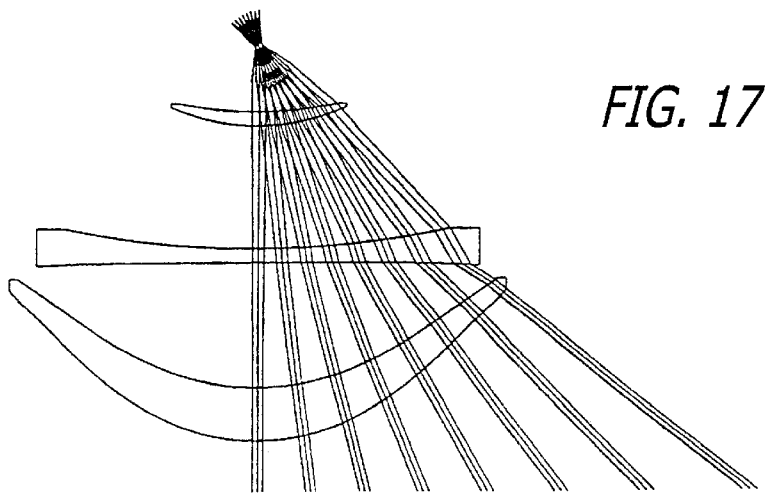
FIG. 17 is a three-element system that is comprised of a domed lens having positive power.
Figure 18:
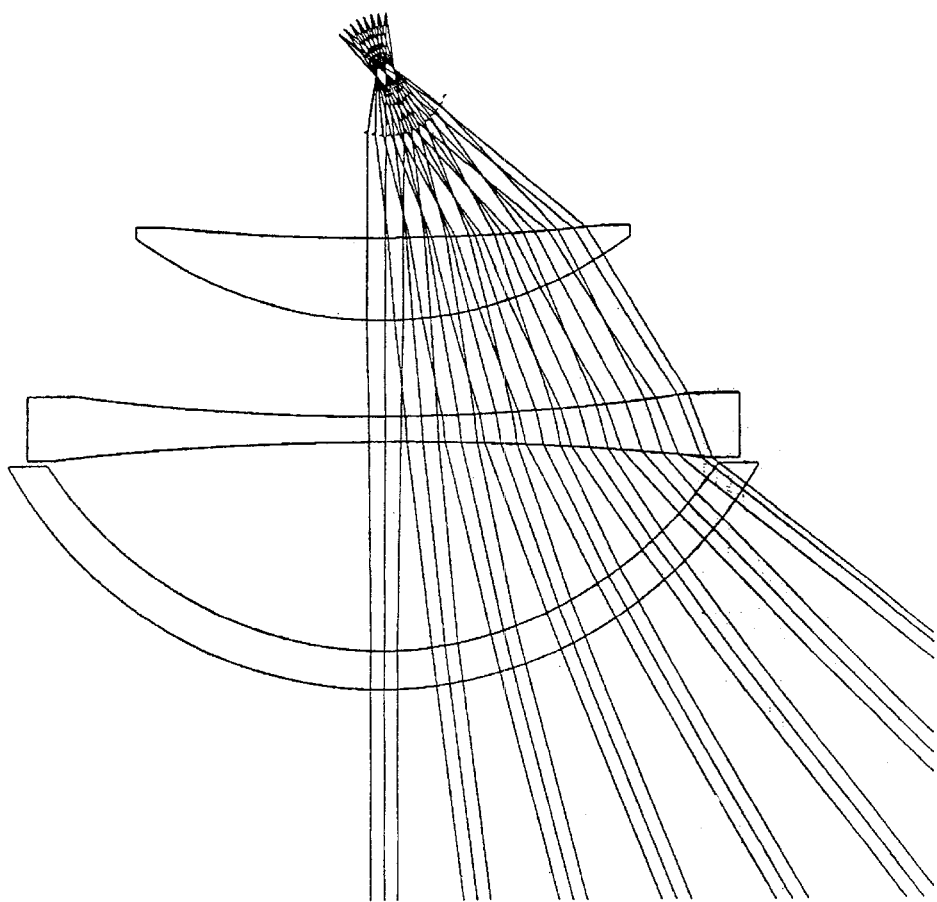
FIG. 18 is a three element system having a middle diverging lens that is bi-concave.

The reverse Galilean telescope design, positioned behind a dome can be used in conjunction with a converging element that is convex toward the diver. This system yields acceptable resolution in the forward look angle, though some lack of performance is to be found at the more extreme nasal and temporal view angles. Examples of this convex-toward-the-face design are embodied in FIGS. 11 through 14. An economical though lower performance system depicted in FIG. 13 lacks the resolution to be achieved from FIG. 14. The domed lens can have an integrally shaped negative power, which in conjunction with the middle element can reduce aberrations. By creating a degree of positive power in the domed lens, some mechanical packaging benefits are gained as depicted in FIGS. 16 and 17; the rear elements can be quite thin, though eye relief of this design is less than ideal.

It will be understood that the foregoing description is of preferred exemplary embodiments of this invention and that the invention is not limited to the specific form shown. For example, a variety of materials may be used to make the lens elements, having a range of dispersive and refractive powers. It has been found that the diverging lens or diverging lens group can be comprised of optical materials having either a refractive index higher than that of the converging lens or converging lens group found at the rear of the lens barrel, or that the dispersion of the middle lens or lens group must (or may) be of a greater dispersion than that of the converging lens or converging lens group found at the rear of the lens barrel. Dispersion is the difference in refractive indices the blue hydrogen spectral line at 486.1 nm and the red hydrogen line at 656.3 nm.

An alternative embodiment is to have a diverging lens or diverging lens group with a refractive index equal to or lower than that of the converging lens or converging lens group.

In the preferred embodiment, the dispersions of the individual lenses or lens groups are chosen so that the lateral chromatic aberration (variation or image size with wavelength) is minimized or reduced to levels that are not disturbing to the wearer. Minimizing the chromatic aberration using the dispersions of the lens materials is advantageous in that scattered light is minimized.

An alternative embodiment is to employ, on one or more optical surfaces of the dome, the diverging lens or diverging lens group, the converging lens or converging lens group, a diffractive optical surface. Diffractive optical surfaces are surfaces with finely spaced (often microscopic) grooves and ridges, which cause the light to diffract or bend. Diffraction is a physical phenomenon that varies rapidly with wavelength. By carefully adjusting the spacings of the ridges and grooves, it is possible to use the resulting diffraction effects to reduce or eliminate the lateral chromatic aberration of the system.

In the preferred embodiment, one of the optical surfaces of the domed window is aspheric. An alternative embodiment is for one of the optical surfaces of the diverging lens or one of the optical surfaces within the diverging lens group to be aspheric. Another alternative embodiment is for one of the optical surfaces of the converging lens or one of the optical surfaces within the converging lens group to be aspheric. Yet another alternative embodiment is for the entire optical system to consist of spherical surfaces, i.e., contain no aspheric surfaces.

It is desirable to minimize the overall size of the dive mask while still providing a large field of view. For this reason, in the preferred embodiment, the two afocal reverse Galilean telescopes (one in front of each eye) are tilted temporally (away from the nose) in the horizontal plane. This enables the dive mask to "wrap around" the face of the wearer, whereas otherwise the front of the mask would have to be very large to afford a large field of view. The preferred range of horizontal tilt angles is between 1 and 40 degrees, preferably between 15 and 35 degrees. Within this range, the value 25 degrees is a preferred value.

One technical difficulty involved in the manufacture of a system comprising a separate afocal. reverse Galilean system for each eye is the issue of "convergence." Convergence refers to the angle between the lines of sight for the two eyes when viewing the same object. Since the human visual system is constructed to allow the eyes to converge to allow viewing nearby objects, a slight amount (i.e., a few degrees) of excess convergence does not disturb the wearer. Therefore, it is not problematic if manufacturing errors cause a slight excess convergence. On the other hand, negative values of convergence are extremely disturbing to the wearer, as this requires that the eyes look away from each other to focus on the same object. If manufacturing tolerances cause negative convergence (divergence) of the eyes, the wearer will experience viewing discomfort. Therefore, in the preferred embodiment, the individual afocal reverse Galilean telescopes are designed to have a very slight magnification, preferably not enough for the wearer to notice (the preferred range is zero to 2 percent, meaning that the image appears 102% larger than actual size. Within this range, 0.5% is the preferred value). This slight magnification causes the nominal convergence (i.e., that which is obtained if the system is manufactured perfectly) to be slightly positive. This slight positive value for the nominal value of the convergence means that even when reasonable tolerances are considered, the convergence is not negative (divergence is never experienced).

These and other modifications may be made in the design and arrangement of the elements without departing from the scope of the invention.

What is claimed is:

1. An optical lens system for an underwater diving mask comprising: A body configured to sealably engage a wearer's face, support members to position two independent reverse-Galilean telescope optical systems in front of each eye of the diver, such that an additional front domed-shaped lens is in contact with water; behind said domed shaped lens is positioned a diverging lens or lens group, in turn behind which is positioned a converging lens or lens group; arranged so as to correct for the magnification effects of viewing objects submerged in water.

2. The diving mask of claim 1 wherein each diverging lens or lens group has a combined refractive index higher than that of the rear converging lens or lens group.

3. The diving mask of claim 1 wherein the diverging lens or lenses have a combined dispersive power greater than that of the rear converging lens or lens group.

4. The mask of claim 1 wherein the domed lens has a spherical surface in contact with the water.

5. The mask of claim 1 wherein the domed lens has an aspherical surface in contact with the water.

6. The mask of claim 1 wherein the domed lens has an R2 concave radius that is spherical.

7. The mask of claim 1 wherein the domed lens has an R2 concave surface that is aspherical.

8. An optical lens system for an underwater diving mask comprising: a body configured to sealably engage a wearer's face, support members to position independent reverse-Galilean telescope optical systems in front of each eye of the diver, such that an additional front domed-shaped lens is in contact with water; behind said domed shaped lens is positioned a diverging lens or lens group, in turn behind which is positioned a converging lens or lens group, arranged so as to correct for the magnification effects of viewing objects submerged in water; the entire lens system for each eye is tilted in a temporal direction on the horizontal plane, such that the left and right optical systems expand their temporal field-of-view angles.

9. The diving mask of claim 8 wherein each diverging lens or lens group has a combined refractive index higher than that of the rear converging lens or lens group.

10. The diving mask of claim 8 wherein the diverging lens or lenses have a combined dispersive power greater than that of the rear converging lens or lens group.

11. The mask of claim 8 wherein the domed lens has a spherical surface in contact with the water.

12. The mask of claim 8 wherein the domed lens has an aspherical surface in contact with the water.

13. The mask of claim 8 wherein the domed lens has an R2 concave radius that is spherical.

14. The mask of claim 8 wherein the domed lens has an R2 concave surface that is aspherical.

15. An optical lens system for an underwater diving mask comprising: a body configured to sealably engage a wearer's face, support members to position two independent panoramic reverse-Galilean telescope optical systems in front of each eye of the diver, such that an additional front domed-shaped lens is in contact with water; behind said domed shaped lens is positioned a diverging lens or lens group, in turn behind which is positioned a converging lens or lens group, arranged so as to correct for the magnification effects of viewing objects submerged in water; the entire lens system for each eye is tilted in a temporal direction on the horizontal plane, such that the left and right optical systems expand their temporal field-of-view angles, and that the forward look is not through the optical axis of the lens system.

16. The diving mask of claim 15 wherein each diverging lens or lens group has a combined refractive index higher than that of the rear converging lens or lens group.

17. The diving mask of claim 15 wherein the diverging lens or lenses have a combined dispersive power greater than that of the rear converging lens or lens group.

18. The mask of claim 15 wherein the domed lens has a spherical surface in contact with the water.

19. The mask of claim 15 wherein the domed lens has an aspherical surface in contact with the water.

20. The mask of claim 15 wherein the domed lens has an R2 concave radius that is spherical.

21. The mask of claim 15 wherein the domed lens has an R2 concave surface that is aspherical.

22. The mask of claim 15 wherein the R2 surface of the rear converging element is convex toward the face of the diver.

23. An underwater diving apparatus, comprising:
   a body configured to sealably engage the head of the user when in position;
   a reverse-Galilean telescope optical system supported by the body;
   the optical system including a domed shaped lens, a diverging lens or lens group, and a converging lens or lens group;
   the domed shaped lens being positioned farthest from an eye of the user and the converging lens or lens group positioned nearest the eye when the apparatus is in the position; and
   the diverging lens or lens group being positioned between the domed shaped lens and the converging lens or lens group.

24. The apparatus of claim 23 wherein the domed shaped lens is positioned relative to the diverging lens or lens group and the converging lens or lens group so as to correct for the magnification effects of viewing objects submerged in water.

25. The apparatus of claim 24 wherein the entire optical system for each eye is tilted in a temporal direction on the horizontal plane, such that a left and a right optical system expands temporal field-of-view angles.

26. The apparatus of claim 25 wherein the forward look is not through the optical axis of the optical system.

27. The apparatus of claim 23 wherein each diverging lens or lens group has a combined refractive index higher than that of the rear converging lens or lens group.

28. The apparatus of claim 23 wherein the diverging lens or lenses have a combined dispersive power greater than that of the rear converging lens or lens group.

29. The apparatus of claim 23 wherein the domed shaped lens has a spherical surface in contact with the water.

30. The apparatus of claim 23 wherein the domed shaped lens has an aspherical surface in contact with the water.

31. The apparatus of claim 23 wherein the domed shaped lens has an R2 concave radius that is spherical.

32. The apparatus of claim 23 wherein the domed shaped lens has an R2 concave surface that is aspherical.

* * * * *